United States Patent [19]
Soules et al.

[11] Patent Number: 6,093,319
[45] Date of Patent: Jul. 25, 2000

[54] POLY (ARYLENE SULFIDE) COMPOSITIONS AND MANUFACTURES

[75] Inventors: David A. Soules; Jon F. Geibel; Aubrey South, Jr., all of Bartlesville, Okla.

[73] Assignee: Phillips Petroleum Company, Bartlesville, Okla.

[21] Appl. No.: 09/213,145

[22] Filed: Dec. 18, 1998

[51] Int. Cl.[7] ........................................ B01D 39/16
[52] U.S. Cl. ...................... 210/500.27; 525/537; 528/388
[58] Field of Search ............................ 525/537; 528/388; 210/500.27

[56] References Cited

FOREIGN PATENT DOCUMENTS

407887 A2  1/1991  European Pat. Off. .
496590 A2  7/1992  European Pat. Off. .

*Primary Examiner*—Robert Dawson
*Assistant Examiner*—D. Aylward
*Attorney, Agent, or Firm*—Polly C. Owen

[57] ABSTRACT

A process is provided for making a composition said process comprising mixing about 60% by weight to about 90% by weight of a first P(AS) having a melt flow index of about 120 grams/10 minutes or more and about 10% by weight to about 40% by weight of a second P(AS) having a melt flow index of about 110 grams/10 minutes or less. In another embodiment of this invention, said composition and manufactures produced from said composition are provided.

9 Claims, No Drawings

6,093,319

POLY (ARYLENE SULFIDE) COMPOSITIONS AND MANUFACTURES

FIELD OF INVENTION

This invention relates to the field of poly(arylene sulfide), hereinafter referred to as P(AS), compositions and manufactures.

BACKGROUND OF THE INVENTION

P(AS) is a polymer possessing good mechanical properties, chemical and flame resistance, and excellent electrical and thermal properties. P(AS) can be utilized in various manufactures including, but not limited to, parts, films, coatings, pipe, and fibers.

Millions of dollars of P(AS) manufactures are sold each year, and the P(AS) industry is continuously conducting research to find new and/or improved P(AS) compositions to make new manufactures or enhance existing manufactures.

It has been found that flash recovered-linear P(AS) can be utilized to produce fibers at a lower cost than fibers made from quench recovered-linear or quench recovered-branched P(AS) due to the lower cost of flash recovered-linear P(AS). P(AS) fibers can withstand hostile environments and can be used to produce manufactures, such as, for example, filter bags for filtration of flue gas, filter media for gas and liquid streams, electrolysis membranes, and protective clothing. However, production problems can occur when making fibers from flash recovered-linear P(AS). For example, the flash recovered-linear P(AS) can produce an abnormal spinline when forced through a die. A fiber having said abnormal spinline is bent and can touch the die causing filament breakage. A fiber having a normal spinline is essentially straight and generally, the fiber does not touch the die causing filament breakage.

This invention provides a solution which can allow the use of flashed recovered-linear P(AS) to make fibers without abnormal spinlines that cause the fiber to be bent. In addition, this invention provides P(AS) fiber with improved tenacity.

SUMMARY OF THE INVENTION

It is an object of this invention to provide a process to make a composition.

It is another object of this invention to provide said composition.

It is yet another object of this invention to provide a manufacture produced from said composition.

In accordance with this invention, a process for making a composition is provided said process comprising mixing about 60% by weight 5 to about 90% by weight of a first P(AS) having a melt flow index of about 120 grams/10 minutes or more and about 10% by weight to about 40% by weight of a second P(AS) having a melt flow index of about 110 grams/10 minutes or less.

In another embodiment of this invention, said composition is provided.

In another embodiment of this invention, a manufacture is produced from said composition.

These objects and other objects of this invention will become more apparent with reference to the following.

DETAILED DESCRIPTION OF THE INVENTION

A process is provided for making a composition said process comprising mixing about 60% by weight to about 90% by weight of a first P(AS) having a melt flow index of about 120 grams/10 minutes or more and about 10% by weight to about 40% by weight of a second P(AS) having a melt flow index of about 110 grams/10 minutes or less.

Said first P(AS) is a flash recovered-linear poly(arylene sulfide). Flash recovered-linear P(AS) is disclosed in U.S. Pat. Nos. 3,478,000, 3,707,528, and 3,800,845, hereby incorporated by reference. Linear P(AS) is produced when dihalogenated aromatic compounds are utilized to produce P(AS). Linear P(AS) is disclosed in U.S. Pat. Nos. 3,478,000, 3,707,528, and 3,800,845, previously incorporated by reference. Branched P(AS) is produced when polyhaloaromatic compounds are utilized as a monomer. Polyhaloaromatic compounds are those having more than two halogen substituents per molecule which can be utilized in preparing branched P(AS). Branched P(AS) is disclosed in U.S. Pat. No. 4,350,810, hereby incorporated by reference.

Preferably, when said composition is utilized for fiber production, said first P(AS) has a melt flow index in the range of about 120 grams/10 minutes to about 1000 grams/10 minutes, most preferably, about 120 grams/10 minutes to about 600 grams/10 minutes, in order to make quality fibers with high tenacity Said second poly(arylene sulfide) is selected from the group consisting of quench recovered-linear poly(arylene sulfide), quench recovered-branched poly(arylene sulfide), and flash recovered-branched poly(arylene sulfide). Production of quench recovered P(AS) is disclosed in U.S. Pat. No. 5,128,445, hereby incorporated by reference. Preferably, in the production of fibers, said second P(AS) in said composition is a quench recovered-linear P(AS) since said fiber has a higher tenacity than when a quench recovered-branched P(AS) or flash recovered-branched P(AS) is utilized. The tenacity of a fiber is the tensile stress expressed as force per unit linear density (e.g. grams-force per denier). Tenacity is determined using ASTM D885 modified using pneumatic fiber grips, a gauge length of four inches, and a crosshead speed of 3.93 inches per minute.

Said first and/or second P(AS) can be produced utilizing modifying agents to obtain higher molecular weight P(AS). Modifying agents are disclosed in U.S. Pat. No. 3,919,177, hereby incorporated by reference Said mixing of said first P(AS) and said second P(AS) to produce said composition can be completed by any method known in the art. For example, said first P(AS) and said second P(AS) can be placed in an extruder to make pellets of said composition.

Said composition can be utilized to produce a manufacture by any means known in the art. Said manufacture can include, but are not limited to, coatings, parts, films, coatings, pipe, and fibers. Methods of producing said manufacture can include, but are not limited to, blow molding, spinning, injection molding, and extrusion. Further information on processing said composition into said manufacture can be found in MODERN PLASTICS ENCYCLOPEDIA, 1992, pages 222–298.

Said composition prepared by this invention can be spun into fibers by any means known in the art. Said fibers can be packaged as a continuous fiber or cut into shorter lengths called staple. Generally, said fibers are produced utilizing melt spinning equipment. In melt spinning, said composition is heated to about 290° C. to about 340° C. to produce a molten composition. Preferably, said composition is heated to about 300° C. to about 330° C., to insure degradation of said composition does not occur. Said molten composition is forced at a constant rate under pressure through a plate called a spinneret or die containing one or more holes to produce a molten fiber. A die containing one hole produces a monofilament fiber. A die containing multiple holes produces a multifilament fiber. The molten fiber emerges downward from the face of the spinneret. Said molten fiber is then cooled. Cooling can be completed by any means known in the art. Typically, air is utilized to cool said molten fiber to produce a fiber. Melt spinning is disclosed in more detail in TEXTBOOK OF POLYMER SCIENCE, 1984, pp. 492–495.

Said fiber can be further processed by any means known in the art. For example, generally, the fiber is drawn or stretched during or subsequent to spinning to effect orientation, thereby optimizing the physical properties of the fiber. Drawing imparts or enhances crystallinity resulting in enhanced fiber tensile strength. Drawing is disclosed in the TEXTBOOK OF POLYMER SCIENCE, 1984, pp. 494–495.

Said fiber prepared according to this invention exhibits excellent properties. During processing, said composition when forced through the die can produce a normal spinline. Secondly, said fiber exhibits an equivalent or higher tenacity than fiber produced from said second P(AS). This is an unexpected result since typically fiber produced from said flash recovered-linear P(AS) has a lower tenacity than fiber produced from said quench recovered-linear P(AS) and quench recovered-branched P(AS).

Said fiber can be used to produce fiber-containing manufactures. For example, said fiber-containing manufactures can be selected from the group consisting of filter bags, filter media, membranes, and protective clothing. Said fiber-containing manufacture can be produced by any method known in the art.

EXAMPLES

The following examples are intended to be illustrative of the invention but are not meant to be construed as limiting the reasonable scope of the invention.

The following test methods were utilized.

Melt flow index was determined by the method of ASTM D 1238–86, Procedure B—Automatically Timed Flow Rate Procedure, Condition 316/5.0 modified to use a 5 minute preheat time, with the values of melt flow expressed in units of grams per ten minutes. The melt flow index is indicative of the molecular weight of the polymer. A low melt flow index indicates high molecular weight polymer.

Denier per filament (DPF) was determined by the following method. First, a denier, which is the weight in grams of 9,000 meters of a material, was measured. The denier was determined by spooling 90 meters of a multifilament using a Yarn Skein Reel. Then, the multifilament was weighed. This weight was multiplied by 100, then divided by the number of filaments in the multifilament, in these examples, 64.

The tenacity of a fiber is the tensile stress expressed as force per unit linear density (e.g. grams-force per denier). The tenacity was determined by utilizing an Instron 4505 manufactured by Instron Corporation in Canton, Mass., per ASTM D885 modified to use pneumatic fiber grips, a gauge length of four inches and a crosshead speed of 3.93 inches per minute.

To determine whether each composition produced a normal spinline, each composition was spun into multifilaments on a Hills 0.75 inch experimental fiber line manufactured by Hills Research and Development, Melbourne, Fla. Visible observations of the spinline were conducted for each composition.

The following poly(phenylene sulfide) (PPS) resins were utilized in these examples.

1) GR01 is a flash recovered-linear PPS obtained commercially from Phillips Petroleum Company as Ryton® PPS, Grade GR01, having a melt flow index of about 120 grams/10 minutes to about 200 grams/10 minutes. Flash recovered-linear PPS can also be obtained commercially from Toray Industries.

2) PR09 is a flash recovered-branched PPS obtained commercially from Phillips Petroleum Company as Ryton® PPS, Grade PR09, having a melt flow index of about 20 grams/10 minutes to about 65 grams/10 minutes.

3) E2080 is a quench recovered-linear PPS obtained commercially from Toray Industries having a melt flow index of about 80 grams/10 minutes to about 110 grams/10 minutes.

4) E1880 is a quench recovered-branched PPS obtained commercially from Toray Industries having a melt flow index of about 50 grams/10 minutes to about 90 grams/10 minutes.

Each composition listed in the tables below was pelletized using a ZSK40 twin screw extruder, manufactured by Krupp, Werner, and Pfleiderer Corporation in Ramsey, N.J., to produce pellets. Said ZSK40 twin screw extruder has 10 heat zones which were set at about 303° C. The pellets were quenched in a water bath and the resulting pellets annealed. The pellets were annealed in a 2 cubic feet jacketed ribbon blender manufactured by Young Industries in Muncy, Pa. The pellets were then analyzed to determine the melt flow index.

Fibers were spun from the pellets on the Hills 0.75 inch experimental fiber line. The Hills 0.75 inch experimental fiber line is comprised of a single screw extruder, a melt pump, a die, an air quench system, and several rolls that allow fiber drawing. The single screw extruder utilized three separate temperature zones. Zone one was at 315° C., zone two was at 326° C., and zone three was at 321° C. The Hills 0.75 inch experimental fiber line utilized a 64 hole die with a final hole diameter of 0.02 inches, which produced a multifilament. The die temperature was 315° C. The multifilament was wrapped around a roll in a drawing step. Takeup speed of the multifilament on the roll and melt pump rate determined the DPF. The takeup speed was set at 415 meters/minute, which was utilized to set the melt pump rate for the experiments. After drawing, the multifilament was wound on a package such that approximately 15 minutes of multifilament production was contained per package.

The package was then taken to an Alex James Monofilament Line manufactured by Alex James Corporation in Greenville, S.C. The Alex James Monofilament Line was used to further draw said multifilament. The Alex James Monofilament Line has three oven zones that are available for drawing and/or annealing. One zone was utilized in these experiments. The temperature was set at 111° C. A feed roll was fixed at 100 feet per minute. Maximum draw ratios (MDR) were determined by increasing the take-up roll speed 5 feet per minute every five seconds until the multifilament broke. At least three breaks were completed, and an average take-up roll speed was calculated. The average take-up roll speed was divided by 100 feet per minute to obtain the MDR. Each of the multifilaments made from said composition was drawn to 85% of the MDR. After drawing was completed on the Alex James Monofilament Line, multifilament samples were then taken and analyzed for tenacity.

Example 1

The data shown in Table 1 indicate that with the addition of 20% by weight of PR09 abnormal spinlines were not observed, which allowed for more efficient production of said multifilaments. However, the tenacity of the multifilament produced from the GR01/PR09 composition was lower than GR01 alone.

Example 2

These data indicate that with the addition of 30% by weight of E2080 abnormal spinlines were not observed, which allowed for more efficient production of said multifilaments. In addition, surprisingly, the tenacity of the multifilament produced from the E2080/GR01 composition was higher than E2080 alone. Therefore, a 70% by weight GR01 and 30% by weight E2080 composition allows for more efficient and less costly production of stronger fibers than with GR01 or E2080 alone.

Example 3

These data indicate that with the addition of 10% by weight of E1880 abnormal spinlines were not observed, which allowed for more efficient production of multifilaments. In addition, surprisingly, the tenacity of the multifilament produced from the E1880/GROI composition was higher than E1880 alone. Therefore, a 90% by weight GR01 and 10% by weight E1880 composition allows for more efficient and less costly production of stronger fibers than with GR01 or E1880 alone.

TABLE I

Compositions Containing GR01 and PR09

| | 100% GR01 | 100% Calcium-washed PR09 | 90% GR01/ 10% PR09 | 80% GR01/ 20% PR09 | 50% GR01/ 50% PR09 |
|---|---|---|---|---|---|
| Abnormal Spinline | Yes | No | Yes | No | No |
| Starting DPF | 9.5 | 10 | 9.82 | 9.80 | 9.82 |
| Final DPF | 2.81 | 4.68 | 2.91 | 2.98 | 3.29 |
| Melt Flow Rate (g/10 min) | 177.3 | 51.3 | 163.7 | 139.8 | 108.4 |
| Tenacity (g/denier) | 3.00 | 2.52 | 2.30 | 2.58 | 2.66 |
| MDR | 4.1:1 | 2.33:1 | 4.05:1 | 3.91:1 | 3.56:1 |

* All percentages are weight percent.

TABLE 2

Compositions Containing GR01 and E2080

| | 100% GR01 | 100% E2080 | 90% GR01/ 10% E2080 | 80% GR01/ 20% E2080 | 70% GR01/ 30% E2080 |
|---|---|---|---|---|---|
| Abnormal Spinline | Yes | Few | Yes | Few | No |
| Starting DPF | 9.85 | 9.84 | 9.96 | 9.96 | 9.98 |
| Final DPF | 3.03 | 3.09 | 2.89 | 2.93 | 3.00 |
| Melt Flow Rate (g/10 min) | 148.6 | 82.5 | 154.9 | 140.1 | 127.7 |
| Tenacity (g/denier) | 2.91 | 3.92 | 4.14 | 4.49 | 4.18 |
| MDR | 3.9:1 | 3.82:1 | 4.15:1 | 4.1:1 | 4.03:1 |

*All percentages are weight percent.

TABLE 3

Compositions Containing GR01 and E1880

| | 100% GR01 | 100% E1880 | 90% GR01/ 10% E1880 | 85% GR01/ 15% E1880 | 80% GR01/ 20% E1880 |
|---|---|---|---|---|---|
| Abnormal Spinlines | Yes | No | No | No | No |
| Starting DPF | 9.85 | 9.82 | 9.98 | 9.98 | 10.01 |
| Final DPF | 3.03 | 3.56 | 2.96 | 2.96 | 3.00 |
| Melt Flow Rate (g/10 min) | 148.6 | 69.3 | 139.1 | 143.5 | 135.1 |
| Tenacity (g/denier) | 2.91 | 3.20 | 3.80 | 3.95 | 4.1 |
| MDR | 3.9:1 | 3.31:1 | 3.98:1 | 4.06:1 | 3.98:1 |

*All percentages are weight percent.

That which is claimed is:

1. A process for making a composition said process comprising:
   1) mixing about 60% by weight to about 90% by weight of a first poly(arylene sulfide) having a melt flow index of about 120 grams/10 minutes or more and about 10% by weight to about 40% by weight of a second poly (arylenc sulfide) having a melt flow index of about 110 grams/10 minutes or less;
   wherein said first poly(arylene sulfide) is a flash recovered-linear poly(arylene sulfide);
   wherein said second poly(arylene sulfide) is selected from the group consisting of quench recovered-linear poly (arylene sulfide), quench recovered-branched poly (arylene sulfide), and flash recovered-branched poly (arylene sulfide).

2. A process according to claim 1 wherein said first poly(arylene sulfide) has a melt flow index in the range of about 120 grams/10 minutes to about 1000 grams/10 minutes.

3. A composition produced by the process in claim 1.

4. A composition comprising about 60% by weight to about 90% by weight of a first poly(arylene sulfide) having a melt flow index of about 120 grams/10 minutes or more and about 10% by weight to about 40% by weight of a second poly(arylene sulfide) having a melt flow index of about 110 grams/10 minutes or less;
   wherein said first poly(arylene sulfide) is a flash recovered-linear poly(arylene sulfide);
   wherein said second poly(arylene sulfide) is selected from the group consisting of quench recovered-linear poly (arylene sulfide), quench recovered-branched poly (arylene sulfide), and flash recovered-branched poly (arylene sulfide).

5. A process of using said composition in claim 4 to produce a manufacture.

6. A manufacture produced by the process of claim 5.

7. A manufacture according to claim 6 wherein said manufacture is a fiber.

8. A process of using said fiber in claim 7 to produce a fiber-containing manufacture.

9. A fiber-containing manufacture according to claim 8 wherein said fiber-containing manufacture is selected from the group consisting of filter bags, filter media, membranes, and protective clothing.

* * * * *